United States Patent [19]
Ardrizzi et al.

[11] Patent Number: 5,504,135
[45] Date of Patent: Apr. 2, 1996

[54] RUBBER PROCESSING OIL AND RUBBER PRODUCTS CONTAINING IT

[75] Inventors: Emilio Ardrizzi; Rolando Vivirito, both of Rome, Italy

[73] Assignee: Exxon Research and Engineering Company, Florham Park, N.J.

[21] Appl. No.: 104,111

[22] PCT Filed: Feb. 21, 1992

[86] PCT No.: PCT/EP92/00379

§ 371 Date: Aug. 13, 1993

§ 102(e) Date: Aug. 13, 1993

[87] PCT Pub. No.: WO92/14479

PCT Pub. Date: Sep. 3, 1992

[30] Foreign Application Priority Data

Feb. 21, 1991 [GB] United Kingdom .................. 9103657

[51] Int. Cl.⁶ ..................................................... C08K 5/01
[52] U.S. Cl. ........................... 524/484; 524/485; 524/486; 524/491; 524/848
[58] Field of Search ..................... 524/491, 848, 524/484, 485, 486, 481, 482, 483

[56] References Cited

U.S. PATENT DOCUMENTS 4,801,373 1/1989 Carman et al. ........................ 208/210
5,034,119 7/1991 Blackburn et al. .

FOREIGN PATENT DOCUMENTS

| | | |
|---|---|---|
| 59-074136 | 4/1984 | Japan . |
| 60-11537 | 1/1985 | Japan . |
| 61-278549 | 12/1986 | Japan . |
| 62-129332 | 6/1987 | Japan . |
| 924065 | 4/1982 | U.S.S.R. . |

OTHER PUBLICATIONS

Kautschuk und Gummi—Kunstoffe, vol. 45, No. 1, Jan. 1992, (Heidelberg), R. Wummelsdorff et al,: "Ein Beibrag zur Reduzierung der polyzyklischen Aromaten aus aromatischen Mineralölweichmachern", pp. 24–29—and English translation thereof.
Rubber World, Dec. 1971, "A New Look at Oils in Rubber", H. F. Weindel and R. R. Terc.

Primary Examiner—Edward Cain
Attorney, Agent, or Firm—James H. Takemoto; Joseph J. Allocca

[57] ABSTRACT

An oil composition which has a kinematic viscosity at 100° C. of from 32 to 50 cSt and which contains less than 3 wt. percent polynuclear aromatic compounds is employed as a process oil for rubber compounds, especially aromatic rubbers. The process oil is compatible with aromatic rubbers but contains less toxic polynuclear aromatic compounds than conventional aromatic rubber process oils. Rubber products of acceptable quality are produced by the use of the said oil composition.

10 Claims, 1 Drawing Sheet

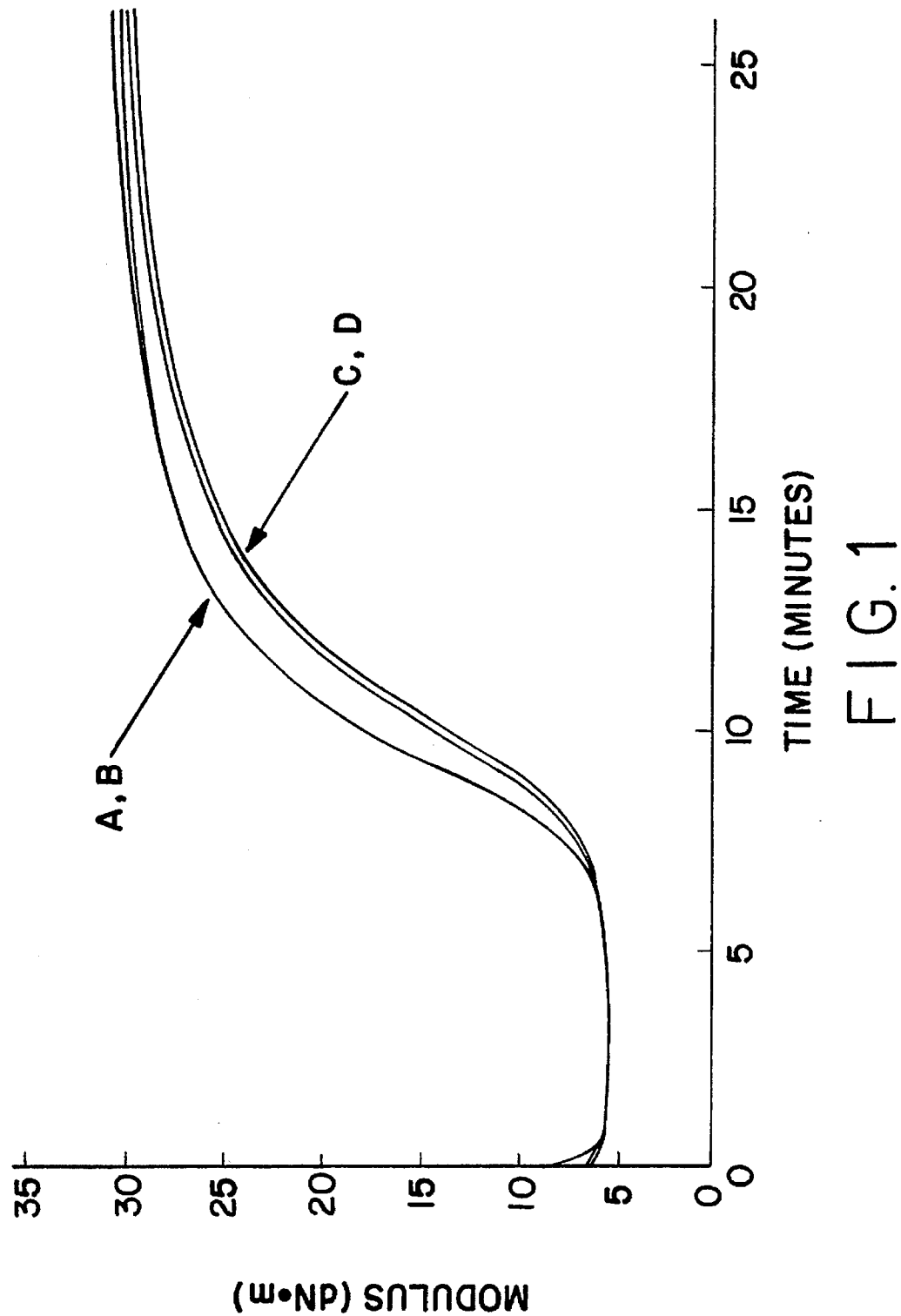

RUBBER PROCESSING OIL AND RUBBER PRODUCTS CONTAINING IT

This invention relates to the use of specified oil compositions as processing oils for rubbers, particularly, but not exclusively, for aromatic rubbers, and to methods of making rubbers employing such oils, and to rubbers made with such oils.

Rubber process oils and extender oils are added to natural and synthetic rubbers for a number of reasons, for example to reduce mixing temperatures during processing and prevent scorching or burning of the rubber polymer when it is being ground to a powder, to decrease the viscosity of the rubber and thereby facilitate milling, extruding and general workability of the rubber compound (which may include added components), to reduce mill and calender shrinkage, to aid the dispersion of fillers, and to modify the physical properties of the vulcanised and/or finished rubber compound, and for other reasons which are well-known to those skilled in the art.

To act as a useful process oil, the oil must have a certain degree of miscibility and/or solvency for the rubber. The degree of miscibility and/or solvency of the process oil with or for the rubber depends upon the nature of the rubber, the components with which it is blended or compounded, and its final use, and is well-known to those skilled in the art. For a rubber containing largely saturated groups, such as butyl rubber, paraffinic process oils are conventionally used. Similarly, for a rubber containing a significant proportion of aromatic groups, such as styrene-butadiene rubber ("SBR"), a highly aromatic process oil is usually employed. Typically such an aromatic oil contains at least 70 weight percent (e.g. 70 to 85 weight percent) total aromatics and from 10 to 15 weight percent polynuclear aromatic compounds ("PNAs"). Whilst these oils show good compatibility with SBR and other rubbers, they have the disadvantage that they are toxic and carcinogenic, largely due to the high PNA content.

There is accordingly a need for a relatively low toxicity, relatively non-carcinogenic product suitable for use as a process oil for rubber compounds in general, and more particularly, aromatic rubber compounds.

According to one aspect, the invention provides the use of an oil composition which has a kinematic viscosity at 100° C. in the range of from 32 to 50 cSt and contains less than 3 weight percent polynuclear aromatic compounds ("PNA") based on the total weight of the hydrocarbons contained in the oil composition, as a process oil for rubber compounds.

The use of the oil according to the invention is especially beneficial as a process oil for aromatic rubbers, such as SBR and the like, as it is sufficiently compatible with such rubbers to aid processing, but contains far fewer PNAs than conventional aromatic rubber process oils and so does not have the disadvantage of being highly toxic.

According to another aspect, the invention provides a method of making or compounding rubber, the method comprising the step of mixing a rubber process oil having a viscosity in the range of from 32 to 50 cSt at 100° C. and a PNA content below 3 weight percent (of the weight of the oil) with (a) rubber or rubber compound (preferably in a suitable form such as crumb, particles and/or powder) and/or (b) one or more monomer precursors of rubber or rubber compound.

According to another aspect, the present invention provides a rubber or a rubber composition or a rubber artefact comprising a process oil having a viscosity in the range of from 32 to 50 cSt at 100° C. and a PNA content below 3 weight percent (relative to the oil).

The oil may be obtained by deasphalting a residuum (e.g. a vacuum residuum) from crude oil, and then dewaxing the resulting deasphalted oil. The deasphalting may be effected with any suitable deasphalting agent such as a paraffinic liquid hydrocarbon (e.g. selected from $C_3$ to $C_7$ alkanes or any mixture thereof). Propane may be preferred as a deasphalting agent. The dewaxing may be performed in any convenient manner using suitable dewaxing agents which may be selected from ketones, alkylbenzenes (such as toluene), N-methylpyrrolidone, alkanes, inter alia, and any suitable mixture thereof. Suitably, the dewaxing may be effected employing either propane or a ketone or mixture of ketones. The oil may boil within the range of from 320° to 650° C. (corrected to atmospheric temperature), e.g. within the range of from 350° to 600° C.

Although the Applicants do not wish to be bound by any theory, they hypothesise that the viscosity of the oil, in the range of from 32 to 50 cSt at 100° C., may indicate the presence of certain types of hydrocarbons which, it is at present believed, enable the oil to act as a process oil for aromatic rubber, inter alia. In particular, the oil is thought to contain long paraffinic branched chains linked to aromatic rings. The kinematic viscosity of the oil may be in the range of from 35 to 45 cSt at 100° C. At 40° C., the viscosity may be preferably in the range from 900 to 1000 cSt, e.g. from 925 to 975 cSt. The viscosity index of the oil may be generally in the range of from 75 to 90.

The description herein gives proportions of types of hydrocarbons present in the oil of this invention. These proportions have been determined by clay gel analysis according to standard test ASTM D 2007 unless otherwise indicated.

The oil may contain from 30 to 55 weight percent, e.g. in the range of from 30 to 50 weight percent (such as in the range of from 35 to 48 weight percent) total aromatic compounds based on the total weight of hydrocarbons contained in the oil. Of this, the amount of PNAs present is less than 3 weight percent, e.g. in the range of from 1 to 3 weight percent, such as in the range of from 1 to 2 weight percent, based on the total weight of hydrocarbons contained in the oil composition, and determined according to standard test IP 346.

The amount of saturates contained in the oil may be in the range of from 40 to 65 weight percent, e.g. in the range of from 40 to 55 weight percent (such as in the range of from 42 to 52 weight percent) based on the total weight of hydrocarbons contained in the oil. The saturates may comprise paraffinics and/or naphthenics, and are usually a mixture of both.

The remainder of the oil composition may be substantially comprised of polar compounds which may be present in an amount in the range of from 4 to 10 weight percent (e.g. in the range of from 4 to 9 weight percent, such as in the range of from 5 to 8.5 percent) based on the total weight of hydrocarbons contained in the oil. The oil may advantageously be solvent-dewaxed and solvent deasphalted and so may contain no, or virtually no, waxes or asphaltenes.

Other preferred characteristics of the oil, which are given here in general and non-limiting terms, include separately or in any combination: a Viscosity Gravity Constant in the range of from 0.82 to 0.88; a Pour Point (ASTM D 97) in the range of from −15° to +3° C.; a Flash Point (Cleveland Open Cup, ASTM D 92) of at least 290° C.

Although the process oil as used according to the invention is particularly useful for aiding the processing of SBR, it can also be employed as a process oil for other rubbers, especially (but not exclusively) unsaturated rubbers, for example EPDM (ethylene-propylene-diene monomer), and natural rubber.

In use, the process oil may be added to the rubber compound when it is being ground in a mixer to discrete particles, for example powder, in order to prevent 'scorching' or 'burning' of the rubber particles by the shearing action of the mixer. Typically from about 10 to 25, preferably from 15 to 20, weight percent of oil may be added to the rubber, based on the weight of the rubber. Alternatively, the oil can be added to the monomer mix before it is polymerised to form the rubber. To facilitate processing, an amount in the range of from 10 to 25 weight percent, e.g. from 15 to 20 weight percent, of the oil based on the weight of the rubber may be added to the monomer mix.

After this first stage of processing, the viscosity of the resulting masterbatch can be modified depending upon the intended application of the rubber. This viscosity can be reduced by adding further quantities of the oil according to the invention, or by adding conventional rubber extender oils. Other additives can be included at this stage if desired. Once the desired viscosity has been attained, the masterbatch may be formed in calenders and then extruded or otherwise formed into the shape of the final product.

The following Table A provides a general comparison of some physical and chemical properties of rubber process oils as used according to the present invention and conventional rubber process oils of the types usually employed for use with rubbers containing significant amounts of aromatic groupings, such as SBR (inter alia). The data in Table A are intended to provide a basis for comparison, without being limitative, and it is contemplated that process oil used according to the invention may have one or more properties outside the stated ranges.

TABLE A

| Property | Oil used in Invention Typical Range of Properties | Conventional High Aromatic Oil Typical Ranges of Properties |
|---|---|---|
| Viscosity (cSt/40° C.) | 900–1000 | — |
| (cSt/100° C.) | 32–50 | 23–29 |
| Viscosity Index | 75–90 | — |
| Specific Gravity (15.6° C.) | — | 0.99–1.01 |
| Viscosity-Gravity Constant | 0.82–0.88 | 0.93–0.96 |
| Aniline Point (°C.) | — | 29–52 |
| Flash Point (°C.) | 290 min | 205 min |
| Pour Point (°C.) | −15 to +3 | +29 max |
| Neutralization Number | — | 1.0–1.5 max |
| Clay Gel Analysis (Wt %) | | |
| Saturates | 40–65 | 10–20 |
| Aromatics | 30–55 | 65–80 |
| Polars | 4–10 | 8–16 |
| PAC (PNA) Analysis (IP-346)* | <3 wt % | — |

*Weight percent of oil that is extracted into dimethyl sulfoxide, consisting primarily of polycyclic aromatic compounds.

The invention is now further described with reference to some Examples, and with reference to the drawing which shows graphs of torque versus time for the curing of rubber compositions, obtained by using an oscillating disc rheometer, for two compositions made in accordance with the prior art and two compositions made in accordance with the invention.

EXAMPLE 1

A mineral oil fraction was obtained from a vacuum residuum fraction of Middle East crude. The fraction boiled in the boiling range of from 350° to 600° C. (corrected to atmospheric pressure), and was solvent dewaxed and solvent deasphalted using conventional petroleum processing techniques. The oil had the characteristics stated in Table B:

TABLE B

| Clay gel analysis ASTM D 2007 | |
|---|---|
| Hydrocarbons: | |
| Total aromatics | 31.5% |
| Saturates (paraffins plus naphthenics) | 61.2% |
| Asphaltenes | 0 |
| Polars | 7.3% |
| PNAs, IP 346 (as percentage of total hydrocarbons) | 1.4% |
| Sulphur, ASTM D 1552 (as percentage of total hydrocarbons) | 2.0% |
| Kinematic viscosity at 40° C., ASTM 445 | 950 cSt |
| Kinematic viscosity at 100° C. | 43 cSt |
| Viscosity index, ASTM D 2270 | 80 |
| Pour point, uninhibited, ASTM D 97 | +3° C. max |
| Flash point, COC, ASTM 92 | 298° C. |

The oil was used as a rubber process oil by adding 18 weight percent of the oil to unextended styrene-butadiene rubber, based on the weight of the rubber. The rubber and process oil were then processed in a Banbury mixer to grind the rubber to a powder. The process oil aided this mixing and grinding process, and prevented scorching and/or burning of the rubber by the shearing action inside the mixer. The resulting cured rubber composition was found to have properties similar to those obtained when using conventional high aromatic rubber process oils. The cured rubber was stable and exhibited no migration of oil components (e.g. no "weeping" or "bleeding" of oil components was observed).

EXAMPLE 2

Comparative tests were performed using two commercially-available conventional rubber processing oils and two oils used according to the present invention. The two conventional oils designated, A and B, were highly aromatic. The two oils used according to the invention, designated B and C, were obtained by propane de-asphalting respective vacuum residua and then solvent-dewaxing the resulting de-asphalted oils. Oil B was solvent-dewaxed employing a ketone-containing solvent, and oil C was solvent-dewaxed employing a propane solvent. Some properties of oils A, B, C and D are given in Table 1.

TABLE 1

| | PROPERTIES OF PROCESS OILS | | | |
|---|---|---|---|---|
| Process Oil Reference | A* | B* | C** | D** |
| Composition (ASTM D2007) | | | | |
| Saturates | 14.8 | 15.0 | 47.0 | 47.8 |

TABLE 1-continued

PROPERTIES OF PROCESS OILS

| Process Oil Reference | A* | B* | C** | D** |
|---|---|---|---|---|
| Aromatics | 76.0 | 74.9 | 45.6 | 44.2 |
| Polar Compounds | 9.2 | 11.1 | 7.4 | 8.0 |
| Viscosity, cS at 98.9° C. | 25.55 | 26.20 | 45.53 | 44.23 |
| (SSU/210° F.) | (122.7) | (125.5) | (213.5) | (207.6) |
| Specific Gravity, g/cm$^3$ | 1.000 | 1.003 | 0.9303 | 0.9310 |
| 15.6° C. (60° F.) | | | | |
| Viscosity-Gravity Constant | 0.947 | 0.950 | 0.839 | 0.839 |
| Aniline Point, °C. (°F.) | 39.4 (103) | 33.3 (92) | 108.3 (227) | 107.2 (225) |
| Pour Point, °C. (°F.) | 21.1 (70) | 10.0 (50) | −9.4 (15) | −15.0 (5) |
| Flash Point, °C. (°F.) | 243.9 (471) | 242.2 (468) | 317.8 (604) | 322.2(612) |

*NOT in accordance with invention
**In accordance with invention

Oils A and B had PNA contents in the range 10 to 15 percent by weight and each was both relatively highly toxic and carcinogenic according to standard tests for carcinogenicity. Oils C and D had PNA contents of between 1 and 2 percent by weight and each was both relatively less toxic than either of oils A and B and non-carcinogenic according to standard tests for carcinogenicity.

Each of the process oils A, B, C and D, was incorporated in a respective sample of a rubber formulation of a type which is commercially used (or representative of a commercially-used formulation) in the manufacture of tire treads. The components and their amounts in the rubber formulation are specified in Table 2.

The samples were each prepared in the same manner, by mixing the carbon black, zinc oxide, microwax, process oil and polymers in a BR Banbury mill unit. The remaining ingredients were added on a roll mill (as in ASTM-D-3182), and milled sheets were then vulcanised in an electrically-heated hydraulic press. The mixing and vulcanisation conditions were the same for all samples.

TABLE 2

PASSENGER-CAR TIRE TREAD COMMERCIAL FORMULATION

| Ingredients | Tradename and/or Supplier, phr* or Specification |
|---|---|
| Styrene-butadiene copolymer | 50.00 Plioflex 1502 (Goodyear) |
| High cis 1,4 polybutadiene | 50.00 Budene 1207 (Goodyear) |
| Process Oil (e.g. highly aromatic oil) | 50.00 |
| N299 carbon black | 75.00 Huber |
| Zinc oxide | 3.00 U.S. National Bureau of Standards |
| Stearic acid | 2.00 U.S. National Bureau of Standards |
| 70% styrenated diphenylamine | 1.00 Wingstay 29 (Goodyear) |
| Mixed diaryl-p-phenylenediamines | 1.25 Wingstay 100 (Goodyear) |
| Microwax | 2.00 Sunolite 240 (Witco) |
| N-oxydiethylene-2-benzothiazole-sulfenamide | 1.25 AMAX (Vanderbilt) |
| Tetramethylthiuram disulfide | 0.25 METHYL TUADS (Vanderbilt) |
| Sulfur | 1.60 U.S. National Bureau of Standards |

*parts by weight per 100 parts by weight of rubber

Each sample was inspected for standard properties which are regarded as important or significant for commercial tire-tread rubber formulations. The results of the inspections are summarised in Table 3.

TABLE 3

RESULTS FOR DIFFERENT PROCESS OILS IN STANDARD TIRE-TREAD FORMULATIONS

| Process Oil Reference | A | B | C | D |
|---|---|---|---|---|
| ODR; 150° C., 1° arc | | | | |
| ΔM, dN-m$^1$ | 25.8 | 25.3 | 25.1 | 25.1 |
| t$_s$1, min$^2$ | 6.6 | 6.7 | 7.2 | 7.2 |
| t'$_{90}$ min$^3$ | 17.0 | 16.0 | 18.4 | 18.6 |
| Rate, dN-m/min$^4$ | 2.12 | 2.33 | 1.91 | 1.88 |
| Stress-strain properties$^5$ Press cure; 150° C., 18 minutes | | | | |
| 100% Modulus, MPa | 1.5 | 1.5 | 1.5 | 1.6 |
| 300% Modulus, MPa | 5.8 | 5.8 | 5.8 | 6.4 |
| Tensile strength, MPa$^6$ | 14.5 | 13.8 | 11.2 | 10.5 |
| Elongation,%$^6$ | 580 | 559 | 490 | 450 |

$^1$ΔM: State of cure--the difference between the maximum and minimum torque values observed on the curing curve.
$^2$t$_s$1: Time to scorch.
$^3$t'$_{90}$: Time to 90% cure.
$^4$Rate: The slope of the line that passes through the curing curve at the points corresponding to t$_s$1 and t'$_{90}$.
$^5$All reported values based on five determinations--high and low values deleted and remaining three values averaged.
$^6$Stress (tensile strength) and strain (elongation) at break, following uniaxial extension.

The cure-development characteristics of the samples were measured according to the procedure of ASTM D-2084 using a Monsanto model 100S oscillating disc rheometer (ODR). Stress-strain properties were determined using an Instron model 4204 universal testing machine following the procedures outlined in ASTM D-412 (Die C dumbbell specimens).

The ODR provides information about two aspects of cure development of the rubber composition: (1) the state of cure (e.g., the crosslink density of the vulcanisate), and (2) the rate of cure. For use of the ODR, a small sample of the milled compound is placed in a heated chamber that also contains an oscillating conical disk. As vulcanisation proceeds, an increasing amount of torque is registered against the disk. The ODR output is graphically plotted as a curve of this torque as a function of time. When the torque value reaches a plateau, the vulcanisation process is considered to be complete. The optimum time for vulcanisation is then determined by analysis of the curve. Representative ODR curing curves for rubber compounds made with oils A, B, C and D are shown in FIG. 1 of the accompanying drawings, and the corresponding ODR results are given in Table 3. The curing curves and data demonstrate that the properties of rubber compositions made in accordance with the invention (oils C and D) are only slightly inferior to those of prior art compositions made with oils A and B, and that all compositions are within the acceptable limits for commercial rubber compositions.

Rubber samples prepared with oils C and D showed no signs of instability, such as migration of oil components (e.g. "bleeding" or "weeping"). The use of conventional rubber process oils, A and B, leads to marginally higher states of cure (ΔM) of the rubber composition than the use of oils C and D in accordance with the invention when identical compounding steps are employed for all four samples. However, these differences are not large, and the results indicate that the extent of crosslink formation is very similar in all four samples. The rates of cure are slightly slower for the samples containing the oils C and D than for the sample containing the oils A and B.

Vulcanisate, i.e., cured rubber composition, stress-strain properties are based on the uniaxial extension of a dumbbell specimen. The dumbbell is extended until it breaks, and the stress recorded at this point (i.e., the force required for the extension) is referred to as the tensile strength. The percent extension at the break point is referred to as percent elongation. Tensile strength and percent elongation are key physical properties, and high values for both parameters are desirable. The stress-strain results are given in Table 3.

Both tensile strength and percent elongation decrease in the order A>B>C>D (left to right in Table 3). These data are consistent with the ΔM values reported in the top half of Table 3, and are attributable to inadequate mixing of the samples containing oils C and D.

The disclosure herein demonstrates that oils having a PNA content below 3 wt. % can be employed successfully as rubber-process oils.

We claim:

1. A rubber composition comprising (a) rubber and/or rubber component(s) and (b) a process oil comprising an oil composition which has a kinematic viscosity at 100° C. in the range of from 32 to 50 cSt, contains in the range of from 30 to 55 weight percent total aromatic compounds based on the total weight of hydrocarbons contained in the oil composition, and contains from 1 up to less than 3 weight percent polynuclear aromatic compounds based on the total weight of hydrocarbons contained in the oil composition.

2. The rubber composition of claim 1 wherein the process oil is made by deasphalting a residuum (e.g., a vacuum residuum) from crude oil distillation, dewaxing the resulting deasphalted oil and recovering said process oil from the resulting dewaxed deasphalted oil.

3. The rubber composition of claim 1 wherein the process oil boils in the range of from 320° to 650° C. (corrected to atmospheric pressure).

4. The rubber composition of claim 1 wherein the process oil contains in the range of from 40 to 65 weight percent saturated hydrocarbon compounds based on the total weight of hydrocarbons contained in the process oil.

5. The rubber composition of claim 1 wherein the process oil has a kinematic viscosity at 100° C. in the range of from 35 to 45 cSt.

6. The rubber composition of claim 1 wherein the rubber or rubber component(s) is an aromatic or aromatic containing rubber.

7. The rubber composition of claim 1 wherein the rubber is styrene-butadiene rubber.

8. The rubber composition of claim 1 wherein the process oil is present in an amount in the range 10 to 25 weight percent based on the weight of the rubber.

9. The rubber composition of claim 1 wherein the process oil is added to either (a) the rubber prior to grinding of the rubber to discrete particles or (b) the monomer(s) mix prior to polymerization of the monomer(s) to form the rubber.

10. The rubber composition of claim 1 wherein the rubber or rubber component(s) is rubber monomer(s).

* * * * *